United States Patent [19]

Pommer et al.

[11] 3,928,606
[45] Dec. 23, 1975

[54] FUNGICIDAL COMPOSITION CONTAINING DIISOPROPYL 3-NITROPHTHALATE AND N-TRIDECYL-2,6-DIMETHYLMORPHOLINE

[75] Inventors: Ernst-Heinrich Pommer, Limburgerhof; Rudolf Polster, Frankenthal; Friedrich Loecher; Manfred Hampel, both of Limburgerhof, all of Germany

[73] Assignee: BASF Aktiengesellschaft, Ludwigshafen (Rhine), Germany

[22] Filed: Nov. 14, 1974

[21] Appl. No.: 523,666

[30] Foreign Application Priority Data
Jan. 1, 1953 Germany......................2365177

[52] U.S. Cl................................ 424/248; 424/309
[51] Int. Cl.².................. A01N 9/20; A01N 9/22

[58] Field of Search............................ 424/248, 309

[56] References Cited
OTHER PUBLICATIONS
Chemical Abstracts 61:13321 a (1964).
Chemical Abstracts 65:9660 c (1966).

*Primary Examiner*—Leonard Schenkman
*Attorney, Agent, or Firm*—Johnston, Keil, Thompson & Shurtleff

[57] ABSTRACT
Valuable fungicide having a strong action and containing a composition of diisopropyl 3-nitroisophthalate and N-tridecyl-2,6-dimethylmorpholine.

1 Claim, No Drawings

FUNGICIDAL COMPOSITION CONTAINING DIISOPROPYL 3-NITROPHTHALATE AND N-TRIDECYL-2,6-DIMETHYLMORPHOLINE

The present invention relates to a fungicide containing a composition of different active ingredients.

It is known to use diisopropyl 3-nitroisophthalate (German 1,218,792) and N-tridecyl-2,6-dimethylmorpholine (German 1,164,152) as fungicides. However, their fungicidal action is poor.

We have now found that a fungicide containing a composition of diisopropyl 3-nitroisophthalate and N-tridecyl-2,6-dimethylmorpholine has a much better fungicidal action than its components.

The fungicide according to the invention is particularly suitable for controlling plant diseases caused by powdery mildews such as Erysiphe graminis in wheat.

The fungicide may be mixed in conventional manner with solid or liquid carriers.

The ratio of the active ingredients to each other may vary considerably; it is however preferred to use a ratio of diisopropyl 3-nitroisophthalate to N-tridecyl-2,6-dimethylmorpholine of from 1:1 to 4:1.

Application rates are from 0.5 to 5 kg per hectare. The fungicides contain, for example, from 10 to 90% of the active ingredient composition.

EXAMPLE

Leaves of wheat seedlings of the "Opal" variety grown in pots are sprayed with aqueous suspensions of the active ingredients in the amounts and ratios given below, and, after the sprayed layer has dried, dusted with spores of wheat powdery mildew (Erysiphe graminis var. tritici). The plants are subsequently placed in the greenhouse at a temperature of from 20° to 22°C and a relative humidity of from 75 to 80%. After 10 days the extent of fungus spread is assessed, the following scale being employed.

0 = no attack, graduated down to
5 = surface of leaves entirely covered by fungus

| Active ingredient | Ratio | Amount of active ingredient in spray liquor in % by weight | Action |
|---|---|---|---|
| diisopropyl 3-nitroisophthalate | — | 0.05 | 3 |
|  |  | 0.1 | 2.5 |
|  |  | 0.15 | 2 |
|  |  | 0.2 | 1 |
| N-tridecyl-2,6-dimethylmorpholine | — | 0.05 | 3.5 |
|  |  | 0.1 | 2 |
|  |  | 0.15 | 2 |
|  |  | 0.2 | 1+ |
| diisopropyl 3-nitroisophthalate + N-tridecyl-2,6-dimethylmorpholine | 1:1 | 0.1 | 1 |
|  | 2:1 | 0.1 | 1 |
|  |  | 0.2 | 0 |
|  | 3:1 | 0.1 | 0.5 |
|  | 4:1 | 0.1 | 1 |
| Control (untreated) | — | — | 5 |

+leaf discoloration

We claim:
1. A fungicidal composition comprising a mixture of diisopropyl 3-nitroisophthalate and N-tridecyl-2,6-dimethylmorpholine in a ratio of from about 1:1 to about 4:1.

* * * * *